Dec. 22, 1936.  W. FERRIS  2,065,219
BROACHING MACHINE
Original Filed Feb. 9, 1934   8 Sheets-Sheet 3

INVENTOR
WALTER FERRIS.
BY
ATTORNEY

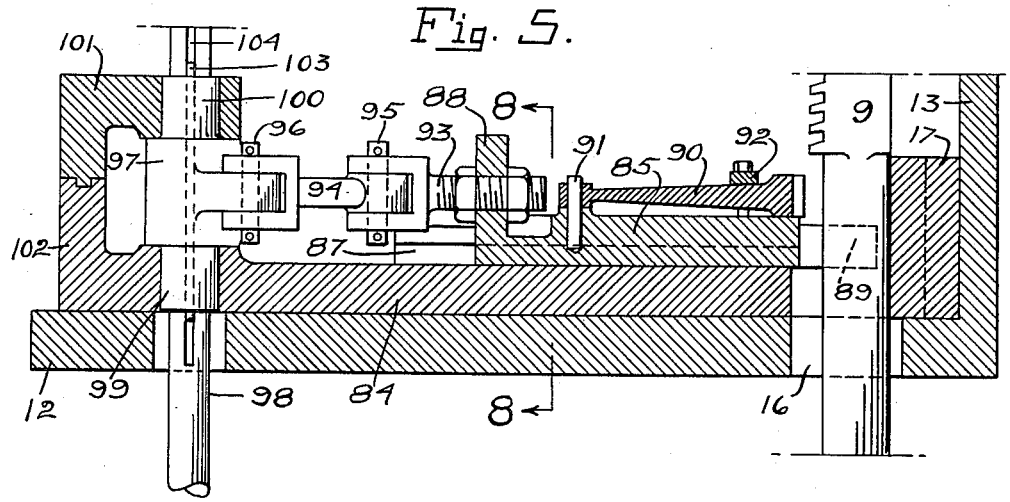
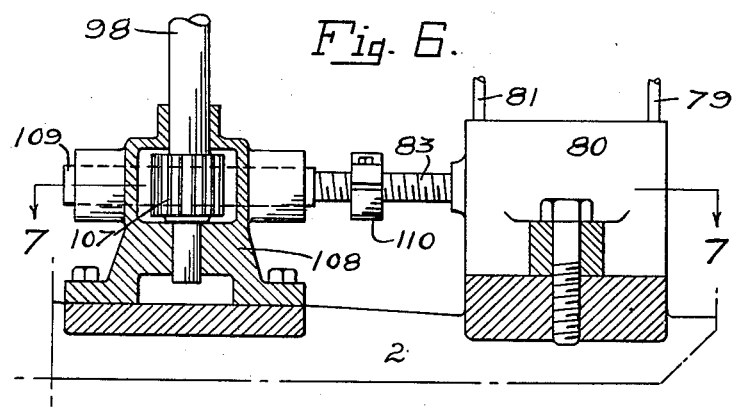
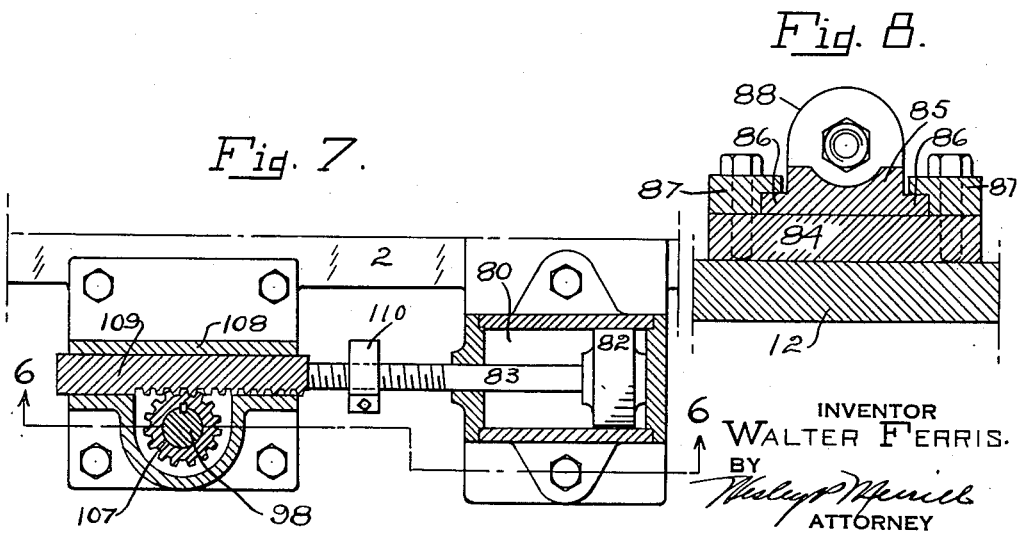

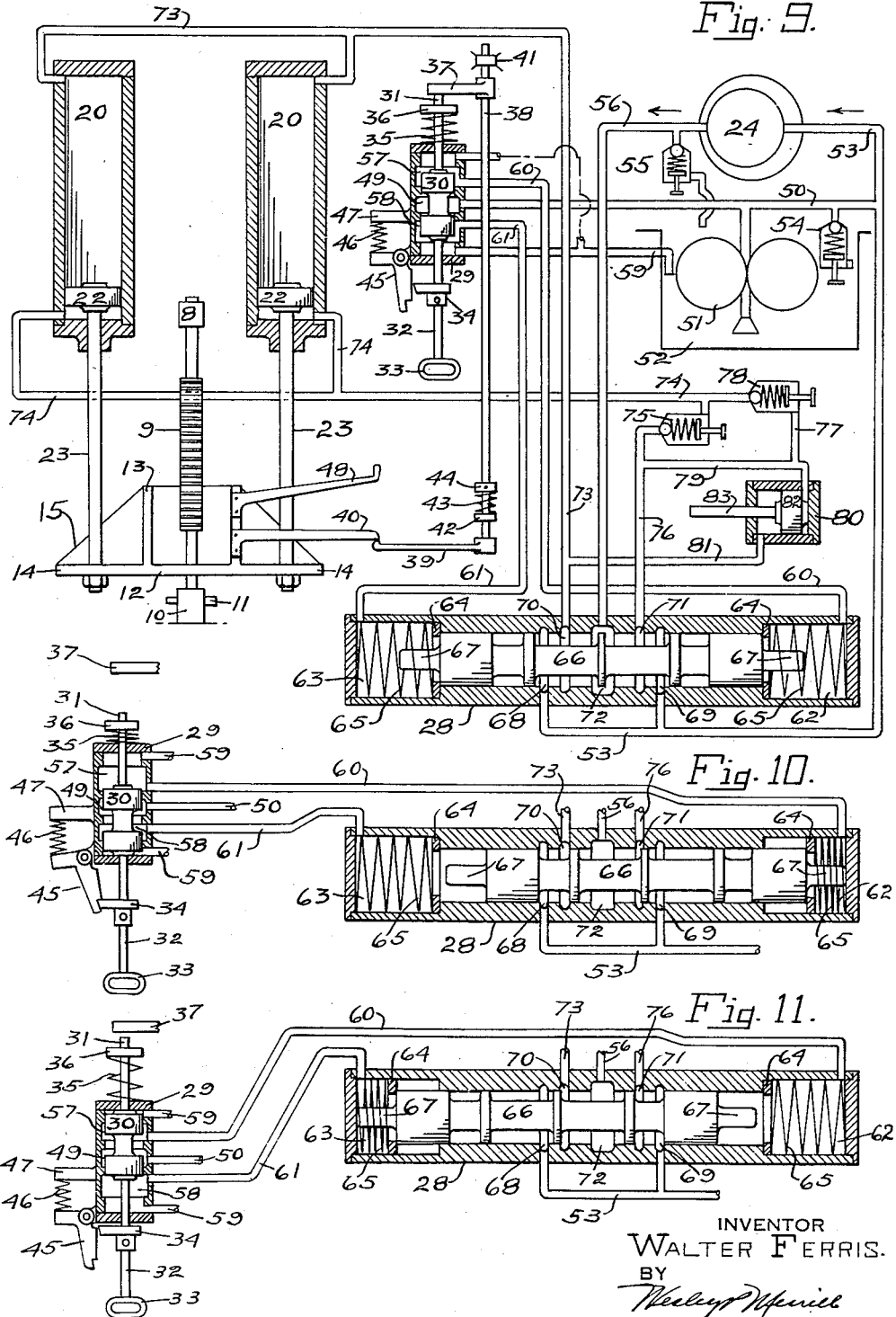

Dec. 22, 1936.   W. FERRIS   2,065,219
BROACHING MACHINE
Original Filed Feb. 9, 1934   8 Sheets-Sheet 6

INVENTOR
WALTER FERRIS
BY
Wesley Merrill
ATTORNEY

Dec. 22, 1936.　　　　W. FERRIS　　　　2,065,219
BROACHING MACHINE
Original Filed Feb. 9, 1934　　8 Sheets-Sheet 7
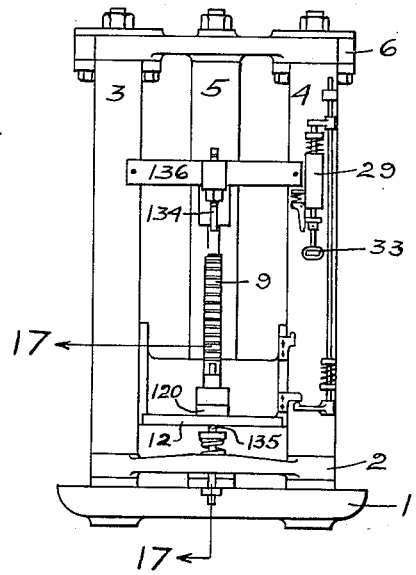
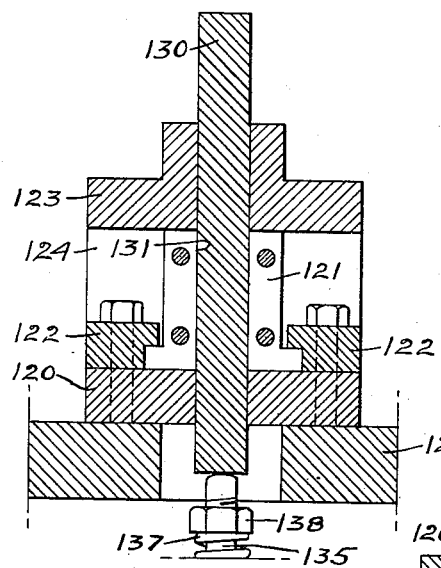
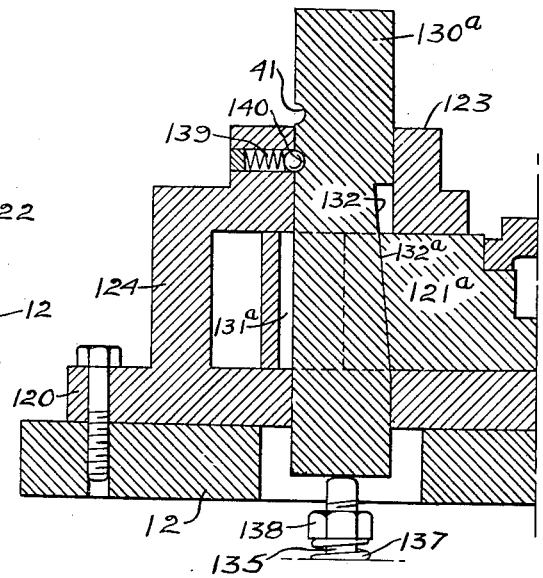
INVENTOR
WALTER FERRIS.
BY
ATTORNEY Dec. 22, 1936.  W. FERRIS  2,065,219
BROACHING MACHINE
Original Filed Feb. 9, 1934   8 Sheets-Sheet 8
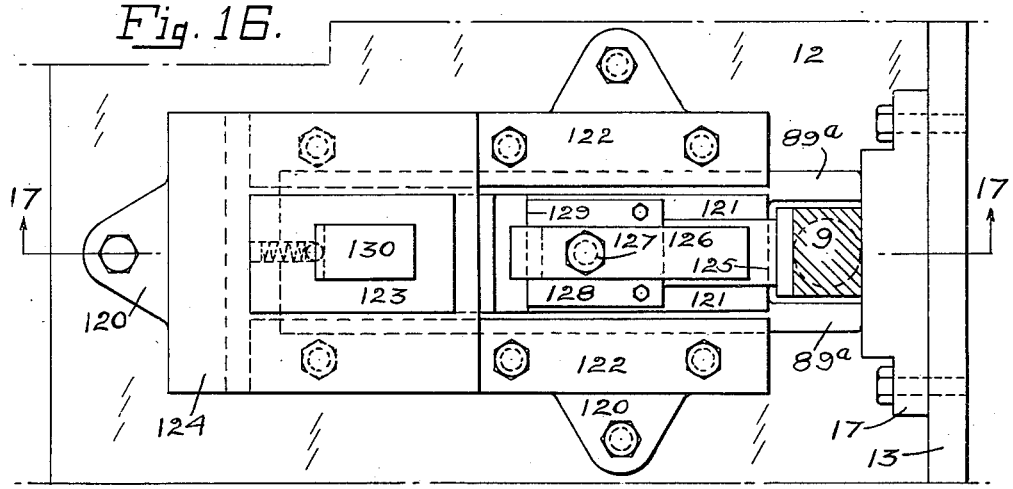
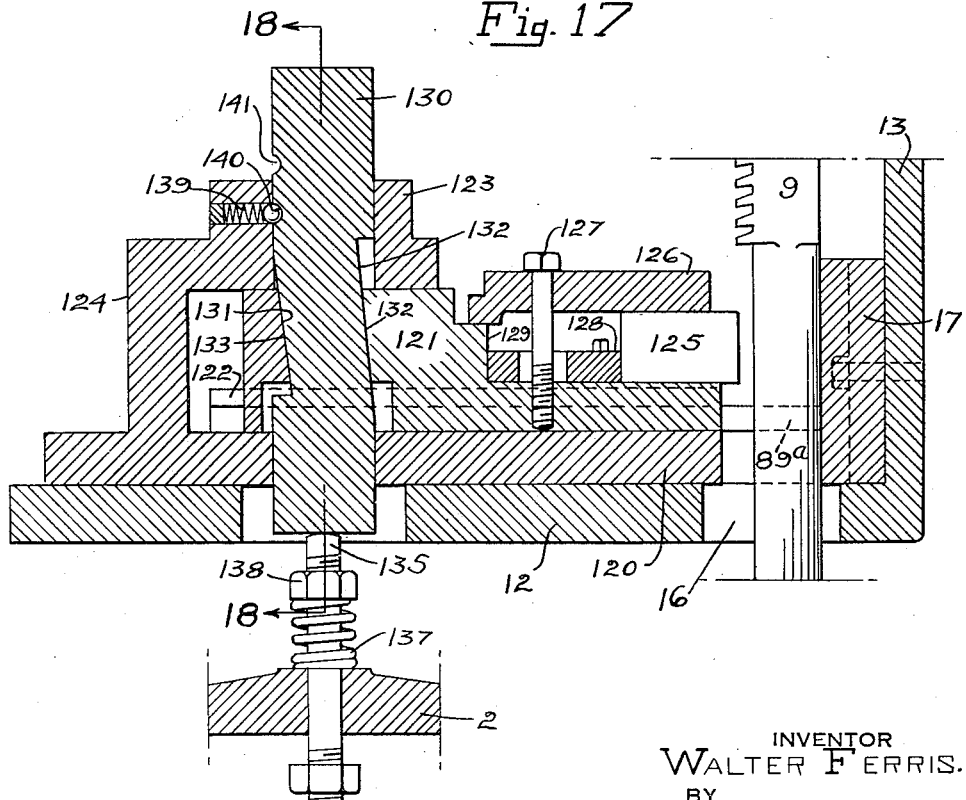
INVENTOR
WALTER FERRIS.
BY
/ATTORNEY Patented Dec. 22, 1936

2,065,219

UNITED STATES PATENT OFFICE 2,065,219

BROACHING MACHINE

Walter Ferris, Milwaukee, Wis., assignor to The Oilgear Company, Milwaukee, Wis., a corporation of Wisconsin Continuation of application Serial No. 710,396, February 9, 1934. This application September 16, 1935, Serial No. 40,790

30 Claims. (Cl. 90—33)

This application is a continuation of application Serial No. 710,396, filed February 9, 1934, as to matters common to both applications.

The invention relates to broaching machines of the type in which a broaching tool is retained in a stationary position and a reciprocable work carrier moves the work along the tool during the broaching operation, such as the broaching machine described and claimed in my prior Patent No. 1,901,500.

The machine disclosed in the above patent is adapted to broach interior surfaces, and the work is ordinarily centered by its contact with the broaching tool.

The present invention has as an object to provide a machine of this character which is capable of broaching exterior surfaces.

A broaching machine has a work carrier and a tool carrier one of which is fixed to the frame of the machine and the other of which slides upon the frame to provide relative movement between the work and the tool in order to enable the tool to broach the work. During the broaching of an exterior surface, the work exerts a thrust against the tool at right angles to the cut and tends to cause relative displacement of the tool and the work.

Another object of the present invention is to provide a surface broaching machine with means for positively preventing any such relative displacement.

Another object is to provide a surface broaching machine in which the work is retained in position to be broached during the cutting stroke of the machine and released during the return stroke.

Another object is to provide a surface broaching machine having a reciprocable work support upon which the work is advanced into position to be engaged by the tool during the cutting stroke of the work support and then retracted from that position in order to clear the tool during the return stroke of the work support.

Another object is to provide a broaching machine of this character which is operated hydraulically.

Another object is to provide a surface broaching machine of this character which is automatic in operation.

Another object is to provide a surface broaching machine which is positive and precise in operation.

Other objects and advantages will be apparent from the description hereinafter given of broaching machines in which the invention is embodied.

According to the invention in its general aspect, the broaching machine is provided with means for retaining the broaching tool in a stationary position, a work support for carrying the work to be broached, power means for reciprocating the work support longitudinally of the broaching tool, and means carried by the work support for preventing any relative displacement of the broaching tool and the work during the broaching operation.

According to the invention in another aspect, the work is automatically advanced into position to be broached and is secured in that position when the work support is at or near one end of its stroke and automatically released or retracted from that position when the work support is at or near the other end of its stroke.

The invention is exemplified by the broaching machines illustrated somewhat schematically in the accompanying drawings in which the views are as follows:

Fig. 5 is a detail view taken in the plane of the line 5—5 of Fig. 4 and showing mechanism for moving the work into and out of position to be broached.

Fig. 6 is a detail view showing the mechanism which operates the mechanism shown in Fig. 5, the view being taken substantially on the line 6—6 of Figs. 2 and 7.

Fig. 7 is a sectional plan view taken on the line 7—7 of Fig. 6.

Fig. 8 is a section taken on the line 8—8 of Fig. 5.

Fig. 9 is a diagram of the hydraulic circuit and shows the reversing and the control valves in the positions occupied when the machine is idle.

Fig. 10 is a schematic drawing showing the reversing and control valves in the positions occupied when the machine is making a cutting stroke.

Fig. 11 is a view similar to Fig. 10 but showing the reversing and control valves in the positions occupied when the machine is making a return stroke.

Fig. 15 is a front view of a broaching machine which has a mechanically operated work holder.

Fig. 16 is a top plan view of the work holder shown in Fig. 17.

Fig. 17 is a central section through the work holder shown in Fig. 16 and employed on the machine shown in Fig. 15, the view being taken substantially on a line 17—17 of Figs. 15 and 16.

Fig. 18 is a section taken on the line 18—18 of Fig. 17.

Fig. 19 is a view similar to Fig. 17 but showing a modified form of work holder.

Fig. 20 is a front elevation of another surface broaching machine in which the invention is embodied.

Fig. 22 is a sectional plan view taken on the line 22—22 of Fig. 20.

Figure 1:
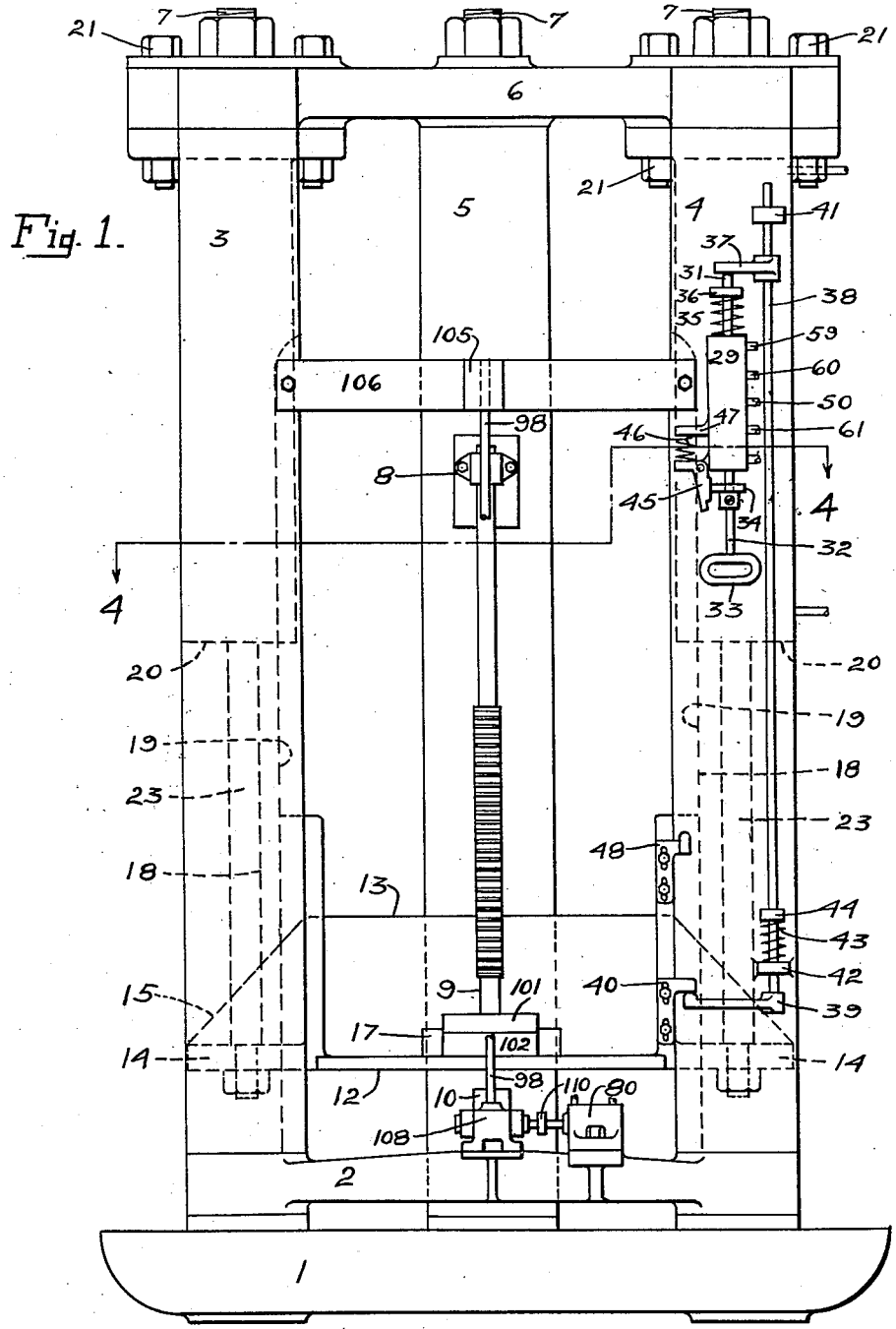
Fig. 1 is a front view of a machine which has its work holder operated by a hydraulic motor arranged upon the base of the machine.
Figure 2:
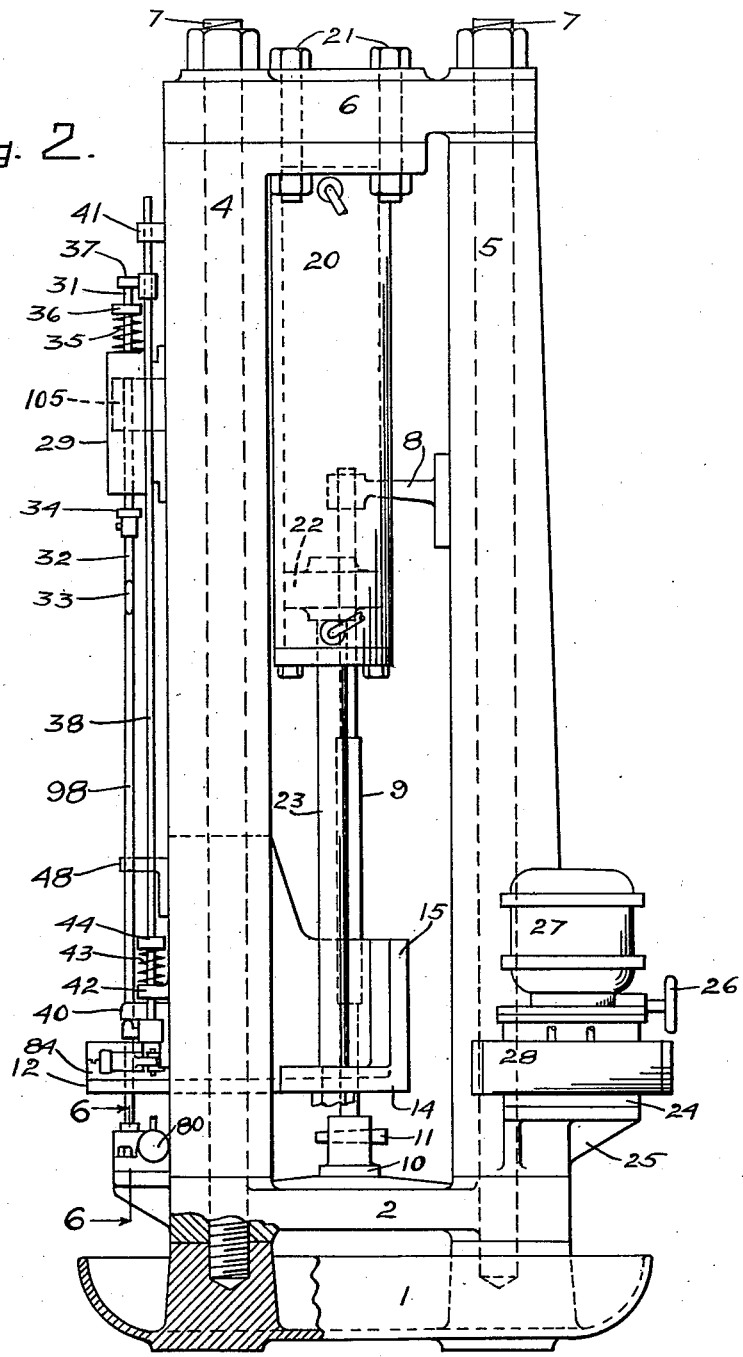
Fig. 2 is an elevation of the right side of the machine shown in Fig. 1.
Figure 3:
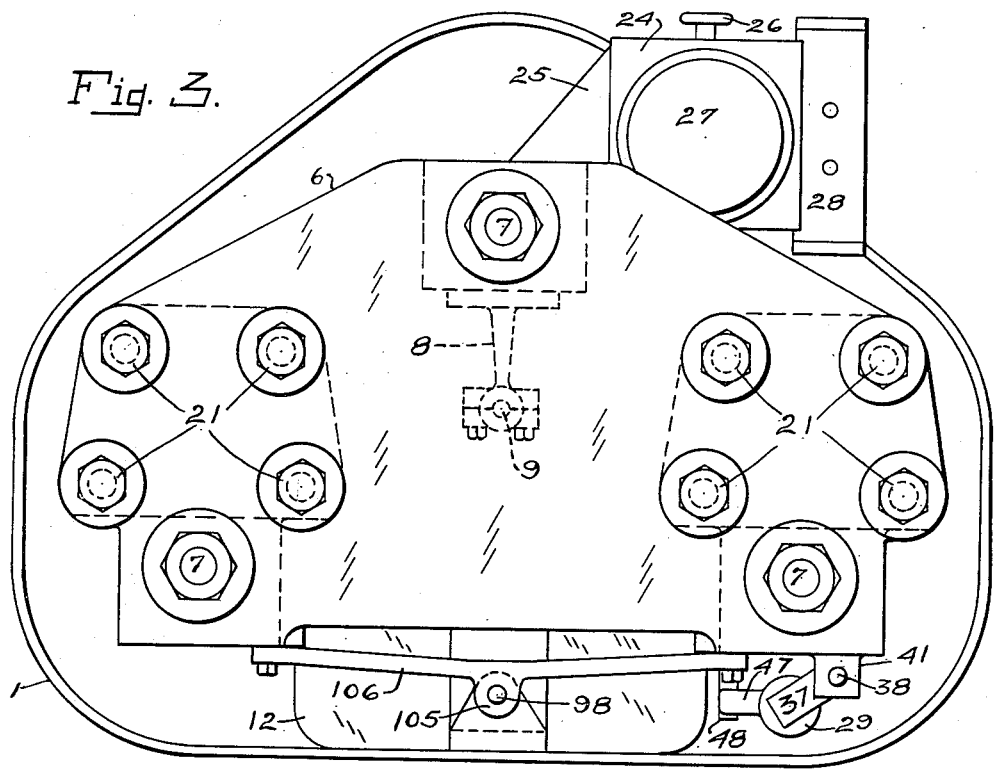
Fig. 3 is a top plan view thereof.

For the purpose of illustration, the broaching machine is shown as being of the same general construction as the machine shown in Patent No. 1,901,500 referred to above. In practice, however, this type of machine has its frame and work support made of structural plates and shapes welded or otherwise fastened together and its hydraulic motors arranged in reverse position with the cylinders thereof fastened to the lower part of the frame so that the motors push the work support upward instead of pulling it upward as shown, but the function and operating characteristics of the machine are the same.

Figs. 1 to 19

As shown, the broaching machine has its mechanism carried by a frame consisting primarily of a base 1 which is shaped to provide a receptacle to catch chips and liquid, a bottom girder 2 arranged upon the base, two front columns 3 and 4 and a rear column 5 supported by the girder 2, and a top girder 6 arranged upon the upper ends of the columns and secured in place by three tension rods 7 each of which extends through a column and the bottom girder and is fastened to the base as by being threaded therein.

The rear column 5 carries upon the front face thereof a broach support 8 which has the upper end of a surface broaching tool 9 removably secured therein to restrain it from lateral movement.

The broaching tool 9 is removably secured at its lower end in a draw head 10 as by means of a key 11 inserted through alined slots formed in the draw head and in the lower end of the broaching tool in the customary manner.

The draw head 10 is rigidly secured to the bottom girder 2 and restrains the broaching tool from movement in any direction.

The broaching tool is adapted to operate upon work carried by a work support which is reciprocated vertically to move the work along the broaching tool to be broached thereby.

The work support consists primarily of a horizontal bottom plate 12, a vertical side wall 13 extending along the rear edge of the plate 12 and along the greater part of each of the two lateral sides thereof, a horizontal lug 14 extending from each of its lateral sides in the plane of the bottom plate 12, and a vertical rib 15 connecting the rear edge of each lug 14 to the side wall 13, all of which are rigidly secured together or formed integral with each other.

The bottom plate 12 has an opening 16 formed therein to permit the broaching tool 9 to extend therethrough, and the wall 13 has attached to the front face thereof in alinement with the opening 16 an abutment 17 which engages the tool 9 upon the rear face thereof and prevents it from being deflected by the thrust of the work during the broaching operation.

The broaching tool 9 may be removed from the machine when the work support is in its lower position by removing the cap from the broach support 8, withdrawing the key 11, lifting the tool out of the draw head 10 and then moving it upward and forward.

Figure 4:
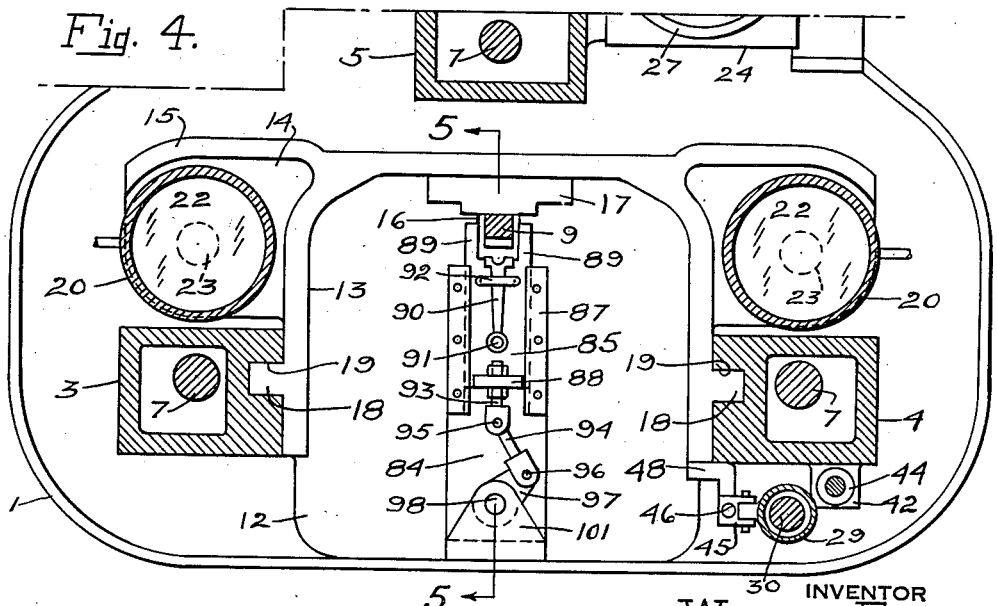
Fig. 4 is a sectional plan view taken on the irregular line 4—4 of Fig. 1.

The work support is guided for vertical reciprocation by the front columns 3 and 4. As shown, it is provided upon each of its lateral sides with a guide 18 which is rigidly secured to or formed integral with the side wall 13 and fitted in a guideway 19 (Fig. 4) formed in the adjacent column.

The work support may be reciprocated by two hydraulic motors 20 each of which is arranged behind one of the front columns and has its cylinder connected at the upper end thereof to the top girder 6 by bolts 21. Each of the motors 20 has a piston 22 fitted in its cylinder and connected by a piston rod 23 to a lug 14 on the work support.

Liquid for operating the motors 20 is supplied by a pump 24 which is arranged in any suitable place, as upon a bracket 25 carried by the rear column 5, and the pump should be adjustable to vary its delivery in order that the machine may be operated at various broaching speeds.

A pump which may be employed is shown in Patent No. 1,901,501. This pump is provided with a handwheel 26 for adjusting its displacement and it is driven by an electric motor 27 directly connected thereto.

The delivery of liquid from the pump 24 to the motors 20 is controlled by a hydraulically operated reversing valve 28 which is shown mounted upon the casing of the pump 24. Valve 28 is controlled by a control valve 29 carried by the column 4 upon the front thereof.

The flow of liquid through the valve 29 is controlled by its plunger 30 (Fig. 9) which is provided at its upper end with a stem 31 and at its lower end with a stem 32 having an operating handle 33 upon its lower end and an abutment 34 fixed thereon intermediate its ends.

The plunger 30 is urged upward by a helical compression spring 35 which encircles the stem 31 between a collar 36 fixed thereon and the end of the valve casing.

When the machine is idle, the plunger 30 is retained in its neutral position, as shown in Figs. 1 and 9, by an arm 37 which abuts the upper end of the valve stem 31 and is carried by a control rod 38 having an arm 39 fixed upon its lower end and in the path of a stop 40 carried by the work support in an adjusted position upon the front end of the wall 13.

The control rod 38 is arranged in an upper guide 41 and a lower guide 42 carried by the column 4, and it is supported therein by a helical compression spring 43 which rests upon the guide 42 and abuts a collar 44 fixed upon the rod 38.

To start the machine, the valve plunger 30 is moved downward manually to the position shown in Fig. 10 in which position it is held by a bell crank lever 45 pivoted upon the casing of the valve 29.

The depending arm of the lever 45 is notched to engage the abutment 34 when the plunger 30 is moved to its Fig. 10 position, and it is urged into engagement with the abutment 34 by a helical compression spring 46 arranged between the horizontal arm of the bell crank lever 45 and a lug 47 carried by the casing of valve 29.

When the work support approaches the upper limit of its movement, a stop 48 fixed in adjusted position upon the end of wall 13 engages the horizontal arm of the bell crank lever 45 and swings the depending arm thereof out of engagement with the abutment 34 to permit the spring 35 to move the plunger 30 of the control valve 29 upward to its Fig. 11 position and thereby cause reversal of the machine.

When the work support approaches the lower limit of its movement, the stop 40 engages the arm 39 and moves the control rod 38 downward, thereby causing the arm 37 to depress the valve stem 31 and return the plunger 30 of the control valve 29 to its neutral position.

If the machine is to be controlled manually, the control valve lock is rendered inoperative, as by loosening the abutment 34 from the valve stem 32 and by rotating the rod 38 in the guides 41 and 42 to swing the arms 37 and 39 out of alinement, respectively, with the stem 31 and the stop 40.

Referring now more particularly to Fig. 9, the control valve 29 has an admission port 49 arranged intermediate the ends of its casing and connected to the discharge pipe 50 of an auxiliary pump 51 which draws liquid from a reservoir 52 and discharges it into the discharge pipe 50 for operating the reversing valve 28 and also for keeping the circuit flooded to compensate for leakage losses and for variations in the volumetric capacity of the circuit due to the displacement of the piston rods 23.

The auxiliary pump 51 is ordinarily driven in unison with the pump 24 and arranged in the same casing, and its outlet is connected to the intake channel 53 of the pump 24. Liquid delivered by the pump 51 in excess of requirements is discharged into the reservoir 52 through a low pressure relief valve 54, and the pressure created by the pump 24 is limited by a high pressure relief valve 55 which is connected to the discharge channel 56 of the pump 24 and discharges into the reservoir 52, all as disclosed in the patent referred to above.

The control valve 29 has two distributing ports 57 and 58 formed in its casing upon opposite sides of the port 49 and both ends of its casing connected to a drain pipe 59 which discharges into the reservoir 52.

The ports 57 and 58 are connected, respectively, by two pipes 60 and 61 to two pressure chambers 62 and 63 arranged at opposite ends of the reversing valve 28.

The chambers 62 and 63 are larger in diameter than the bore of the reversing valve 28, and each contains a washer 64 which is urged inward by a helical compression spring 65 arranged between it and the outer end of the chamber.

The plunger 30 of the control valve 29 controls the flow of liquid from the auxiliary pump 51 to the chambers 62 and 63 and, when it is in its neutral position as shown in Fig. 9, it blocks communication between the admission port 49 and the distributing ports 57 and 58 so that both of the chambers 62 and 63 are closed to the auxiliary pump 51 and open to the drain pipe 59.

In this position of the control valve plunger 30, each washer 64 is urged by its spring 65 against, or substantially against, the end piston of a valve plunger 66 which controls the flow of liquid through the casing of the reversing valve 28 and has a stop 67 arranged upon each of its ends to limit its movement in each direction.

When the control valve plunger 30 is moved to its advance position as shown in Fig. 10, liquid from the pump 51 may enter the chamber 63 and move the plunger 66 to the right to the position determined by the stop 67 on the right end thereof, liquid being exhausted from the chamber 62 through the pipe 60 and the valve 29 into the drain pipe 59.

When the control valve plunger 29 is moved to its return position, as shown in Fig. 11, the flow of liquid to and from the chambers 62 and 63 and the movement of the valve plunger 66 are reversed.

The reversing valve plunger 66 controls the flow of liquid through the casing of the valve 28 which has two return ports 68 and 69 formed therein and spaced from each other, two distributing ports 70 and 71 formed therein between the two return ports, and an admission port 72 formed therein between the two distributing ports.

The variable displacement pump 24 has its discharge channel 56 connected to the admission port 72 and its return channel 53 connected to both of the return ports 68 and 69. Both of the motors 20 have the upper ends thereof connected to the port 70 by a pipe 73 and the lower ends thereof connected through a pipe 74, a low pressure resistance valve 75 and a pipe 76 to the port 71.

Liquid cannot flow through the resistance valve 75 from the pipe 74 to the pipe 76 but it can flow therethrough in the opposite direction after the pressure in the pipe 76 has reached a predetermined value, for instance 100 lb. per sq. in.

The pipe 74 is also connected to one end of a pipe 77 through a low pressure resistance valve 78 which prevents liquid from flowing from the pipe 77 to the pipe 74 but permits it to flow in the opposite direction after the pressure in the pipe 74 has reached a predetermined value, for instance 100 lb. per sq. in.

The pipe 77 has its other end connected intermediate the ends of a pipe 79 having one of its ends connected to the pipe 76 intermediate the ends thereof and its other end connected to the head end of the cylinder of a clamping motor 80 which has its gland end connected by a pipe 81 to the pipe 73 intermediate the ends thereof.

The clamping motor 80, which is employed for moving the work into position to be broached, has a piston 82 fitted in its cylinder and provided with a rod 83.

The resistance valve 75 is employed to cause the clamping motor to be operated to advance the work into position to be broached before the work support is raised, and the resistance valve 78 is employed to cause the clamping motor to be operated to retract the work out of broaching position before the work support is lowered.

Figure 12:
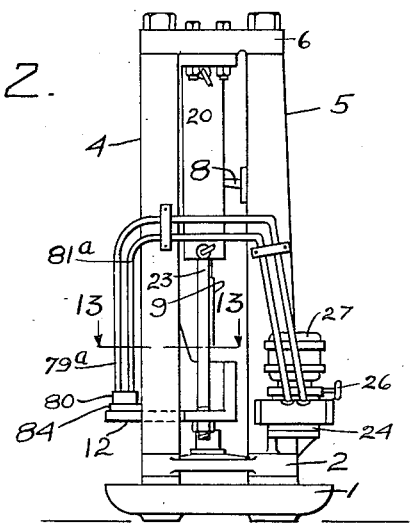
Fig. 12 is a side view of a broaching machine which has its work holder operated by a hydraulic motor arranged upon the movable work support.
Figure 13:
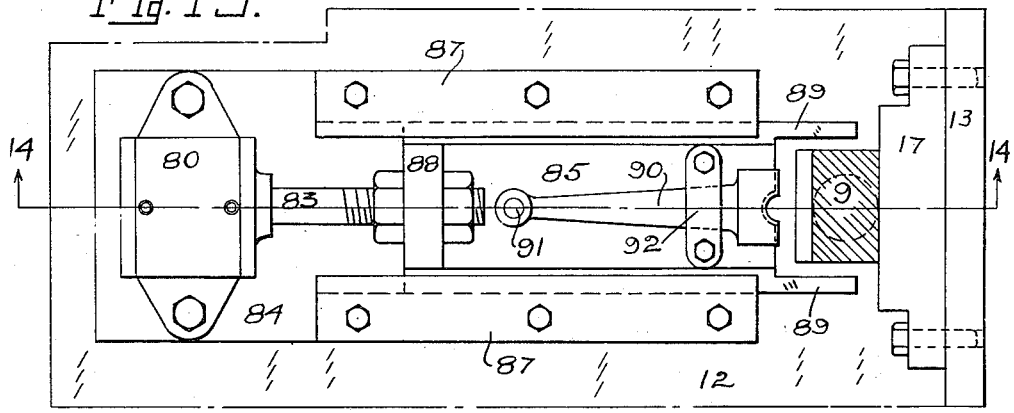
Fig. 13 is a plan view taken in the plane of the line 13—13 of Fig. 12 and showing details of the work holder.
Figure 14:
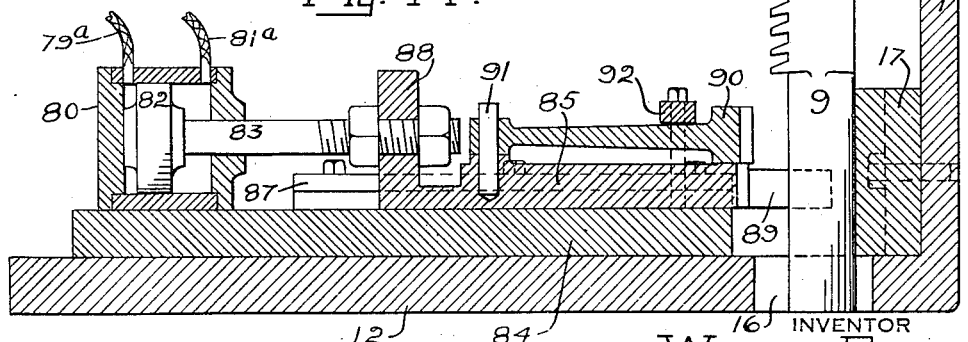
Fig. 14 is a section taken on the line 14—14 of Fig. 13.

The clamping motor 80 may be arranged in a stationary position and mechanically connected to clamping mechanism arranged upon the work support, as shown in Figs. 1 to 8, or it may be arranged upon the work support and connected direct to the clamping mechanism as shown in Figs. 12 to 14.

If the clamping mechanism is to be operated mechanically, as shown in Figs. 15 to 18, the clamping motor 80, the resistance valves 75 and 78 and the pipes 77, 79, and 81 are omitted and the pipe 76 connected direct to the pipe 74.

Figs. 1-11

The broaching machine shown in these figures has a clamping mechanism or work holder arranged upon the work support and operated through intervening mechanism by the motor 80 which is shown arranged upon the bottom girder 2 in a stationary position.

The work holder is provided with a horizontal base plate 84 which is fixed to the bottom plate 12 of the work support in a stationary position and has a slide 85 arranged thereon and provided along each of its lateral sides with a guide or gib 86.

The base plate 84 has two undercut guide bars 87 removably attached thereto along its opposite sides and overlapping the gibs 86 to restrain the slide 85 from lateral or upward movement.

The slide 85 is provided at its front end with a vertical flange 88 and at its rear end with two stops 89 which extend rearward upon each side of the tool 9 and limit the rearward movement of the slide 85 by engaging the abutment 17.

The work holder is shown adapted to move a piece of work 90, such as a connecting rod for an internal combustion engine, into and out of position to be broached by the tool 9.

The connecting rod 90 is fastened in position by a pin 91 fixed in the slide 85 and extending through the piston pin bearing of the rod 90 which may be further secured in position by a clamp 92.

The slide 85 is reciprocated by an eyebolt 93 which is fastened to the flange 88 and has a bifurcated head in which one end of a link 94 is pivoted upon a pin 95.

The link 94 has its other end bifurcated and pivoted by a pin 96 upon a lever 97 which is splined upon a vertical shaft 98 and has a lower hub 99 and an upper hub 100 journaled, respectively, in the base plate 84 and in a bearing plate 101 attached to and supported from the base plate 84 by means of a vertical flange 102.

The lever 97 may be splined to the shaft 98 by a key 103 which is fixed to the lever 97 and fitted in an elongated keyway 104 formed in the shaft 98.

The upper end of the shaft 98 is journaled in a bearing 105 carried by a strut 106 which is fastened at its ends to the columns 3 and 4.

The shaft 98 has its lower end provided with a pinion 107 and journaled in a bearing 108 which is attached to the bottom girder 2 and has a rack 109 fitted therein in mesh with the pinion 107 and adapted to be reciprocated transversely of the shaft 98.

The rack 109 is attached to piston rod 83 of the motor 80 and its movement in one or both directions may be limited by one or more stop collars 110 arranged in adjusted positions upon the rod 83 to abut either the bearing 108 or the end of the motor 80 or both.

Preferably, the eyebolt 93 is so adjusted in the flange 88 that the link 94 and the lever 97 will be in axial alinement with it when the work 90 is in proper position to be broached. When so adjusted, the shaft 98 is relieved of any substantial amount of torque during the broaching operation, the thrust of the broaching tool being transmitted through the hubs 99 and 100 of the lever 97 to the base plate 84 and the bearing plate 101.

The work 90 may be stopped in the proper broaching position either by providing stops 89 of the proper length or by adjusting the stop collar 110 to bear against the end of the bearing 108 when the work is in the proper position to be broached. In either case, each piece of work will be accurately broached to the proper size.

Assuming that the work holder is properly adjusted and a piece of work fastened thereon, that the pumps 24 and 51 are running and that the work support is in its lower position as shown in the drawings, the machine will operate as follows:

When the handle 33 is drawn downward to its limit, the spring 46 will swing the bell crank lever 45 and cause the notch in the depending arm thereof to engage the abutment 34 and retain the control valve plunger 30 in the position shown in Fig. 10.

Liquid from the auxiliary pump 51 may now flow through the control valve 29 and the pipe 61 to the chamber 63 and move the reversing valve plunger 66 toward the right until the stop 67 engages the end of the chamber 62, as shown in Fig. 10, liquid being exhausted from the chamber 62 through the pipe 60 and the control valve 29 into the drain pipe 59.

Liquid from the pump 24 may now flow through the channel 56, the valve 28, and the pipes 76 and 79 into the head end of the motor 80 and advance its piston 82, liquid being exhausted from the motor 80 through the pipes 81 and 73 and the valve 28 into the return channel 53. The resistance valve 75 prevents the liquid from flowing into the pipe 74 until the pressure in the pipe 76 reaches a predetermined value.

Advancing the piston 82 causes the rack 109 to rotate the pinion 107 and the shaft 98 and thereby swing the lever 97 to move the work into position to be broached.

When the work reaches its broaching position, the motor 80 is stalled either by the stops 89 engaging the abutment 17 or by the stop collar 110 engaging the end of the bearing 108.

Stalling the motor 80 causes the pump pressure to rise and liquid to break through the resistance valve 75. Liquid then flows through the pipe 74 to the lower end of the cylinders 20 and raises the pistons 22 and the work support, thereby passing the work along the face of the tool 9 to be broached thereby. Liquid is exhausted from the upper ends of the motors 20 through the pipe 73 and the valve 28 into the return channel 53.

During the broaching operation, the work exerts a thrust against the tool at right angles to the direction of the cut. If the tool should be supported at its ends only, it would be deflected by the thrust of the work. If the tool and the work were carried, respectively, by two relatively movable parts of the machine and the tool should be supported opposite its working part solely by the machine part to which it is fastened as is the general practice, the thrust of the work would cause relative displacement of the two parts of the machine and, consequently, relative displacement of the tool and the work due to yielding of the machine parts. In either case, the machine could not perform accurate work.

The present invention overcomes this objectionable feature and enables the machine to perform accurate work by providing means whereby the work support itself takes the thrust of the work. In the embodiments shown in Figs. 1 to 19, the abutment 17 slides along the back of the tool 9 and remains in firm contact therewith so that the thrust of the work is transmitted through the tool 9 to the abutment 17 which is a part of the work support and is immovable relative thereto. Consequently, neither deflection of the tool nor yielding of machine parts is caused by the thrust of the work.

As the work support starts upward, the stop 40 moves out of contact with the arm 39 and permits the spring 43 to raise the control rod 38 and thereby raise the arm 37 out of the way of the valve stem 31 when it is moved upward by the spring 35.

The work support continues to move upward until the stop 48 engages the horizontal arm of the bell crank lever 45 and swings the depending arm thereof out of engagement with the abutment 34, and then the spring 35 raises the control valve plunger 30 to the position shown in Fig. 11.

Liquid from the auxiliary pump 51 may then flow through the pipe 50, the control valve 29 and the pipe 60 to the chamber 62 and shift the reversing valve plunger 66 to the left until the stop 67 abuts the end of the chamber 63, as shown in Fig. 11.

Liquid from the pump 24 may now flow through the channel 56, the valve 28 and the pipes 73 and 81 into the gland end of the motor 80 and retract its piston 82, liquid being exhausted from the head end of the motor 80 through the pipes 79 and 76 and the valve 28 into the return channel 53, and the resistance valve 78 preventing liquid from escaping from the pipe 74 into the pipe 76 and thereby preventing the work support from descending until pump pressure reaches a predetermined value.

Retracting the piston 82 causes the rack 109 to rotate the pinion 107 and the shaft 98 and thereby swing the lever 97 to retract the work holder so that the work will not engage the tool 9 during the downward movement of the work support.

When the work is fully retracted, the motor 80 is stalled either by its piston 82 engaging the head end of its cylinder or by the stop collar 110 engaging the gland end thereof.

Stalling the motor 80 causes the pump pressure to rise sufficiently to overcome the resistance of the valve 78 and permit liquid to be exhausted from the lower ends of the motors 20. Then liquid from the pump 24 flows into the upper ends of the motors 20 and moves the pistons 22 thereof and the work support downward, liquid being exhausted from the lower ends of the motors through the pipe 74, the resistance valve 78, the pipes 77, 79 and 76 and the valve 28 into the return channel 53.

As the work support approaches the limit of its downward movement, the stop 40 engages the arm 39 and moves the control rod 38 and the arm 37 downward, and the arm 37 engages the valve stem 31 and moves the plunger 30 of the control valve 29 downward to its central or neutral position, as shown in Fig. 9.

Moving the control valve plunger to its neutral position closes communication between the admission port 49 and the distributing ports 57 and 58 and opens both of the chambers 62 and 63 to the drain pipe 59, thereby permitting the spring 65 in the chamber 63 to move the reversing valve plunger 66 to its central or neutral position.

With the plunger 66 in its neutral position, the output of the pump 24 is bypassed from the discharge channel 56 through the reversing valve 28 to the return channel 53 and the machine comes to rest.

*Figs. 12–14*

The broaching machine shown in these figures is exactly the same as the machine previously described except for such changes as are necessitated by arranging the clamping motor 80 upon the work support and connecting it direct to the work holder.

Consequently, the machine has not been illustrated in detail and the parts shown which are the same as the corresponding parts of the machine shown in Figs. 1 to 11 have been indicated by the same reference numerals.

In this form of the invention, the motor 80 is arranged upon the base plate 84 in a stationary position and has its piston rod connected direct to the flange 88 of the slide 85 as by means of nuts threaded thereon.

The motor 80, when energized, moves the work into broaching position by acting directly upon the slide 85, the forward movement of the work being limited by the stops 89 engaging the abutment 17 or by the motor 80 being properly adjusted upon the base plate 84 and its piston 82 stalling against the end of its cylinder.

Since the motor 80 moves with the work support, it is necessary to connect it into the circuit through flexible connections, such as by slide pipes, by pipes having flexible joints therein, or by flexible pipes. As shown, the pipes 79 and 81 (Fig. 9) have been replaced, respectively, by flexible pipes 79a and 81a (Fig. 12).

The machine operates in exactly the same manner as the machine shown in Figs. 1 to 11 except that the motor 80 acts direct upon the work holder. Consequently, a description of the operation will not be given.

*Figs. 15–19*

The machine shown in these figures is the same as the machine shown in Figs. 1 to 11 except that its work holder is operated mechanically. Consequently, the machine has not been illustrated in detail and the parts shown which are the same as the corresponding parts of the machine shown in Figs. 1 to 11 have been indicated by the same reference numerals.

The work holder is provided with a base plate 120 which is arranged upon the bottom plate 12 of the work support in a stationary position and has a slide 121 arranged thereon between two guide bars 122 which are fastened to the base plate 120 upon opposite sides of the slide 121.

The guide bars 122 are undercut and overlap suitable gibs formed on the slide 121 which is thus restrained from vertical or lateral movement but is permitted to reciprocate freely toward and from the tool 9.

The front part of the slide 121 is considerably thicker than the rear part thereof and fitted between the base plate 120 and a bearing plate 123 arranged parallel to the base plate 120 and rigidly connected thereto by a vertical flange 124.

The rear part of the slide 121 is adapted to have a piece of work 125 secured thereon as by means of a clamp bar 126 connected to the slide by a clamping bolt 127 and having its front end arranged upon the work and its rear end arranged upon a shoulder formed in the front part of the slide.

The work 125 is accurately positioned upon the slide by a spacer 128 arranged between it and a shoulder 129 formed on the slide between the front and the rear parts thereof.

The slide 121 may be moved toward the tool 9 by a wedge-bar 130 which extends therethrough and is fitted in an opening 131 formed therein.

The upper and lower end portions of the wedge-bar 130 are provided with parallel faces and fitted in the base plate 120 and in the bearing plate 123 to reciprocate therein.

In order that the tool holder may be readily assembled, the slide 121 is divided along the opening 131 into two parts which are firmly connected to each other in any suitable manner, as by means of bolts.

The wedge-bar is provided upon its rear edge intermediate its ends with an inclined cam face 132 which engages a complementary face formed in the wall of the opening 131.

These faces extend downward and rearward so that, when the wedge-bar is moved upward relative to the work support, the slide 121 will be moved rearward toward the tool 9.

The front edge of the wedge-bar may be provided intermediate its ends with an inclined cam face 133 which is parallel to the face 132 and in contact with a complementary face formed in the slide 121, as shown in Fig. 17, or it may be shaped to remain out of contact with the slide as shown in Fig. 19 in which the front edge of the wedge-bar 130ª is shown as being straight and spaced from the front wall of the opening 131ª in the slide 121ª.

When the wedge-bar 130 or 130ª is moved upward relative to the work support, it moves the slide 121 rearward toward the tool 9. When the wedge-bar 130 (Fig. 17) is moved downward relative to the work support, it moves the slide 121 forward away from the tool 9. When the wedge-bar 130ª (Fig. 19) is moved downward relative to the work support, it releases the slide 121ª so that the work carried thereby is not held in contact with the tool 9 during the downward movement of the work support.

In order that the wedge-bar may move successive pieces of work into exactly the same position, the slide 121 may be provided with two stops 89ª which engage the abutment 17 and limit the rearward movement of the slide.

The wedge-bar is operated in one direction or the other by engaging an adjustable stationary abutment 134 or 135 near each end of the movement of the work support.

The abutment 134 is shown as a rod threaded through a strut 136 which has its ends fastened to the columns 3 and 4 above the upper limit of the work support movement.

The abutment 135 is shown as a threaded rod which extends through the bottom girder 2 and is supported by a heavy helical spring 137 arranged between the girder 2 and a nut 138 threaded upon the rod.

When the work support approaches the lower limit of its movement, the lower end of the wedge-bar 130 engages the abutment 135 and is held stationary thereby. As the work support continues to descend, the cam face 132 moves the slide 121 rearward until the stops 89ª engage the abutment 17 and then the wedge-bar descends a short distance with the work support and compresses the spring 137.

At approximately the time that the stops 89ª engage the abutment 17, the stop 40 engages the arm 39 and then a slight further movement of the work support causes the control valve 29 to be operated to stop the machine, the spring 137 being provided to insure that the slide 121 is in its operative position before the valve 29 is operated.

When the work support moves upward, the wedge-bar 130 is prevented from moving downward out of its clamping position by a spring detent 139 which is arranged in the bearing plate 123 and engages a recess 140 formed in the wedge-bar.

As the work support approaches the upper limit of its movement, the upper end of the wedge-bar 130 engages the stop 134 which prevents further upward movement thereof and permits the work support to move the slide along the wedge-bar, thereby forcing the detent 139 out of the recess 140 and relieving the pressure between the slide and the cam face 132 on the wedge-bar.

If the wedge-bar is of the type shown in Fig. 17, the cam face 133 will retract the slide and the work during continued upward movement of the work support.

If the wedge-bar is of the type shown in Fig. 19, the cam face 132 will be retracted out of contact with the slide during continued upward movement of the work support so that, when the work support descends, the work may be pushed back by any obstruction such as chips clinging to the teeth of the tool.

Just after the wedge-bar engages the abutment 134, the stop 48 engages the bell crank lever 45 and disengages it from the abutment 34 to permit the spring 35 to operate the control valve 29 which causes the reversing valve 28 to be operated and the work support to descend.

During descent of the work support, the wedge-bar is prevented from dropping below a predetermined point by the detent 139 engaging a recess 141 formed in the wedge-bar.

The operation of the machine is obvious from the foregoing description since the work support is reciprocated and controlled in exactly the same manner as in the machine shown in Figs. 1 to 11 and previously described.

Figure 21:
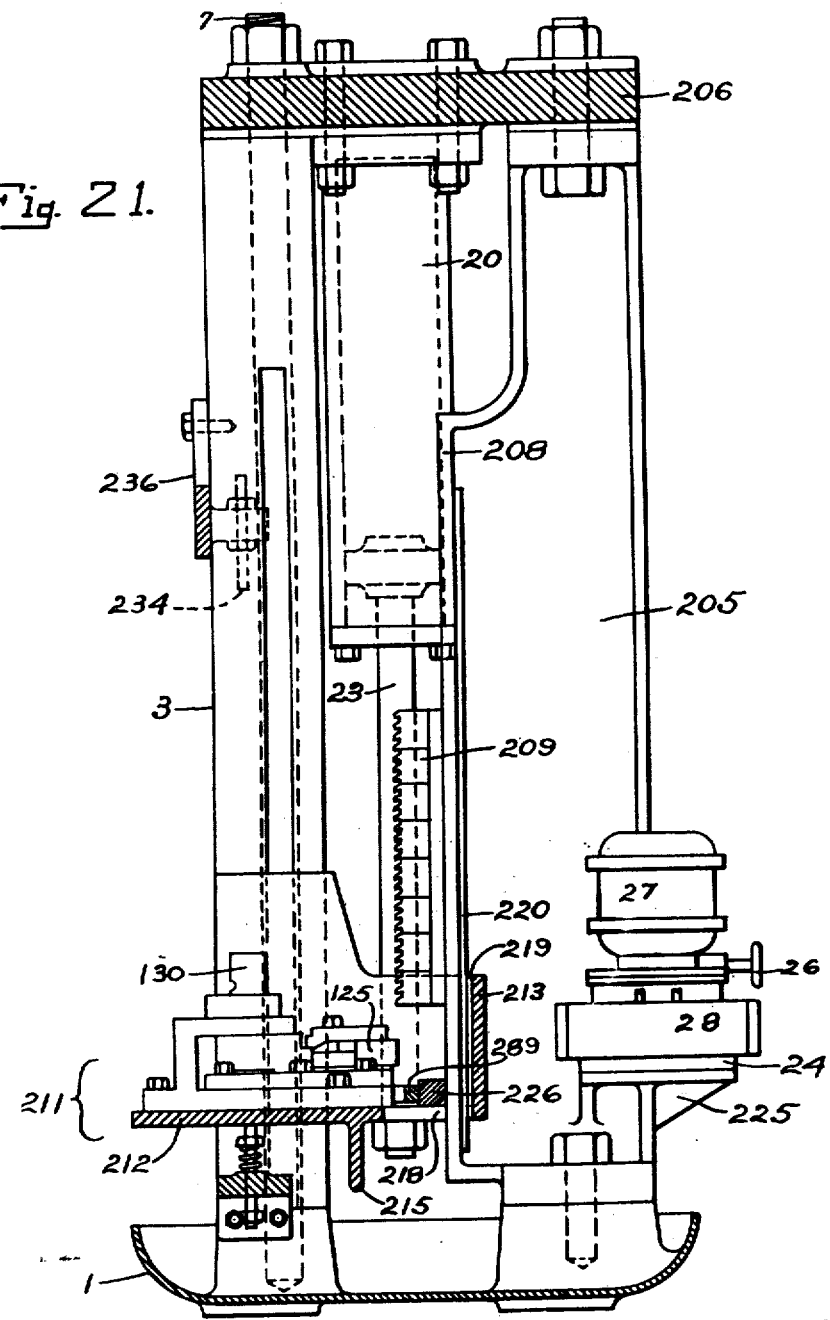
Fig. 21 is in part a vertical section and in part a side view of the machine shown in Fig. 20, the view being taken along the irregular line 21—21 of Fig. 22.

*Figs. 20 to 22*

The machine shown in these figures differs primarily from the machine shown in Fig. 1 in that the broaching tool is made in sections and bolted or otherwise fastened throughout its length to the frame, and the work support has the rear part thereof bifurcated and extended behind and into contact with that part of the machine to which the broaching tool is fastened in order that the thrust of the work may be taken by the work support. Otherwise the machine is similar to the machine shown in Fig. 1 and like parts have been indicated by like reference numerals.

As shown, the machine has its mechanism carried by a frame consisting primarily of a base 1, two front colmns 3 and 4 and a rear column 205 which are supported upon the base 1, and a top girder 206 which is arranged upon the upper end of all three columns. The girder 206 is secured in position at its front by two tension rods 7 each of which extends through the girder 206 and through a front column and is threaded into the base 1, and at its rear by being bolted to the upper end of the rear column 205 the other end of which is bolted to the base 1.

The rear column 205 is shown as a modified H section having a front flange 208 which functions as a tool support and has a sectional surface broaching tool 209 rigidly but removably secured to its front face as by being bolted thereto.

The work to be broached is carried by a work support 211 which consists primarily of a flat bottom plate 212, two marginal side walls 213 extending along opposite sides of the bottom plate and across the greater part of the rear edge thereof, a lifting lug 214 extending from each of its lateral sides, a rib 215 arranged upon the underface thereof and extending across the bottom plate 212 and the lugs 214 to stiffen the same, and a guide 216 arranged upon the outer face of each marginal wall 213 near the front end thereof to guide the work support for vertical reciprocation, all of which are formed integral with each other or rigidly secured together as by welding. Each guide 216 is fitted for reciprocation in a guideway 217 one of which is formed in the inner face of each of the front columns 3 and 4.

The bottom plate 12 has an opening 218 formed therein and extending forward from the rear edge thereof to admit the flange or tool support 208 and the broaching tool 209. The adjacent ends of the marginal walls 213 extend behind the flange 208 and may be arranged to slide thereon. As shown, each wall 213 is provided at its ends with a wear plate 219 which is fixed thereto and slidable along a wear strip 220 fixed to the rear face of the flange 208. The wear plates 219 are held in firm engagement with the wear strips 220 to enable the walls 213 to take the transverse thrust of the work during broaching and to assist in guiding the work support during reciprocation thereof.

The work support 212 is reciprocated by two hydraulic motors 20 each of which has its cylinder fastened at the upper end thereof to the top girder 206 and its piston rod 23 connected to a lug 214. The hydraulic motors 20 are driven by liquid supplied by a pump 24 which is carried by a bracket 225 fastened to the rear column 205. The hydraulic circuit and the control mechanism are the same as in the machine shown in Fig. 1 and the parts thereof shown have been indicated by the same reference numerals previously employed but no further description thereof is deemed necessary.

The machine may be provided with any suitable type of work holder but, for the purpose of illustration, it is shown provided with a work holder which is exactly the same as the work holder shown in Figs. 15 to 18 except that, instead of the stops 89ª, the slide 121 is provided with two angular stops 289 each of which is adapted to engage an abutment 226 fixed to the bottom plate 212 alongside the opening 218 and shown as abutting the rear part of the marginal wall 213. The other parts of the work holder have been indicated by the same reference numerals and no further description thereof will be given.

The wedge-bar 130 of the work holder is shifted near the top of the work support movement by an abutment 234 and near the bottom of the work support movement by an abutment 235. The abutment 234 is shown as a threaded stud fixed in adjusted position in a strut 236 which extends across the front of the machine and has its end fastened to the front columns 3 and 4. The abutment 235 is shown as being a threaded rod supported by a helical compression spring 237 which encircles it between a nut 238 threaded thereon and a strut 239 which has its ends fastened to the front columns 3 and 4 and through which the abutment 235 extends.

The work holder operates in the manner previously described to force the stops 289 firmly against the abutments 226, and thereby hold the work 125 in position to be broached during upward movement of the work support, and to retract the work out of broaching position before the work support starts downward.

The machine operates and is controlled in the manner previously described. During the broaching operation, the work 125 exerts a thrust against the tool 209 transverse to the cut or at right angles to the direction of support movement and tends to cause relative displacement of the tool and the work. This thrust, however, is transmitted through the tool 209, the tool support 208 and the wear plates 219 and 220, if any, to the marginal walls 213. The thrust of the work is thus taken by substantially integral parts of the work support and no relative displacement of the tool and the work can occur, thereby enabling the machine to perform accurate work and to perform at high speed work which formerly had to be done at slow speed on milling machines in order to attain the necessary accuracy.

The invention herein set forth is susceptible of various modifications and adaptations without departing from the scope thereof as hereafter claimed.

The invention is hereby claimed as follows:

1. A surface broaching machine, comprising means for retaining a broaching tool in a stationary position, a movable work support for carrying the work to be broached by said tool during movement of said support in one direction, power means for reciprocating said support longitudinally of said tool, means for retaining a piece of work upon said support and fixing it against movement relative thereto during broaching, said work when being broached exerting a thrust against said tool transverse to the direction of support movement and thereby tending to cause relative displacement of said tool and said support, and means carried by said support for taking said thrust to thereby prevent said relative displacement.

2. A surface broaching machine, comprising means for retaining a broaching tool in a stationary position, a movable work support for carrying the work to be broached by said tool during movement of said support in one direction, power means for reciprocating said support longitudinally of said tool, means for retaining a piece of work upon said support and fixing it against movement relative thereto during broaching, said work when being broached exerting a thrust against the face of said tool transverse to the direction of support movement and thereby tending to cause relative displacement of said tool and said support, and abutment means carried by said support and reacting against the back of said tool for taking said thrust to thereby prevent said relative displacement.

3. A surface broaching machine, comprising means for retaining a broaching tool in a stationary position, a movable work support, power means for reciprocating said support longitudinally of said tool, means for retaining work upon said support in position to be broached by said tool during movement of said support in one direction, means carried by said support for providing at a point substantially opposite the working part of said tool a reaction to the thrust of the work against said tool to thereby prevent any relative movement between said support and said tool in a direction at right angles to the direction of support movement, and means for operating said retaining means to release said work from positive engagement with said tool during movement of said support in the opposite direction.

4. A surface broaching machine, comprising means for retaining a broaching tool in a stationary position, a movable work support, power means for reciprocating said support longitudinally of said tool, means for retaining work upon said support in position to be broached by said tool during movement of said support in one direction, and means carried by said support for providing at a point substantially opposite the working part of said tool a reaction to the thrust of the work against said tool to thereby prevent any relative movement between said support and said tool in a direction at right angles to the direction of support movement, and means responsive to said support approaching the limit of its movement in said direction for operating said retaining means to release said work from positive engagement with said tool during movement of said support in the opposite direction.

5. A surface broaching machine, comprising means for retaining a broaching tool in a stationary position, a movable work support, power means for reciprocating said support longitudinally of said tool, means for retaining work upon said support in position to be broached by said tool during movement of said support in one direction, means carried by said support for providing at a point substantially opposite the working part of said tool a reaction to the thrust of the work against said tool to thereby prevent any relative movement between said support and said tool in a direction at right angles to the direction of support movement, and means for retracting said work out of broaching position before said support moves in the opposite direction.

6. A surface broaching machine, comprising means for retaining a broaching tool in a stationary position, a movable work support, power means for reciprocating said support longitudinally of said tool, means for retaining work upon said support in position to be broached by said tool during movement of said support in one direction, means carried by said support for providing at a point substantially opposite the working part of said tool a reaction to the thrust of the work against said tool to thereby prevent any relative movement between said support and said tool in a direction at right angles to the direction of support movement, and means responsive to said support approaching the limit of its movement in said direction for retracting the work out of broaching position.

7. A surface broaching machine, comprising means for retaining a broaching tool in a stationary position, a movable work support for carrying the work to be broached by said tool during movement of said support in one direction, power means arranged alongside and parallel to said tool for reciprocating said support longitudinally of said tool, means for retaining a piece of work upon said support and fixing it against movement relative thereto during broaching, said work when being broached exerting a thrust against said tool transverse to the direction of support movement and thereby tending to cause relative displacement of said tool and said support, and means carried by said support for taking said thrust to thereby prevent said relative displacement.

8. A surface broaching machine, comprising means for retaining a surface broaching tool in a stationary position, a movable support for carrying a piece of work in engagement with said tool, power means for reciprocating said support longitudinally of said tool, a guide carried by said work support and contacting said tool at a point substantially opposite the part of said tool in engagement with the work when said tool is operating upon the work for preventing said tool from being deflected by engagement with the work, and means for retaining a piece of work upon said support in position to be broached by said tool during movement of said support in one direction.

9. A surface broaching machine, comprising means for retaining a surface broaching tool in a stationary position, a movable support for carrying a piece of work, power means for reciprocating said support longitudinally of said tool, a guide carried by said work support in contact with said tool for preventing said tool from being deflected by engagement with the work, means for retaining a piece of work upon said support in position to be broached by said tool during movement of said support in one direction, and means for operating said retaining means to release said work from positive engagement with said tool during movement of said support in the opposite direction.

10. A surface broaching machine, comprising means for retaining a surface broaching tool in a stationary position, a movable support for carrying a piece of work, power means arranged alongside said tool and connected to said support for reciprocating it longitudinally of said tool, a guide carried by said work support in contact with said tool for preventing said tool from being deflected by engagement with the work, means for retaining a piece of work upon said support in position to be broached by said tool during movement of said support in one direction, and means responsive to said support approaching the limit of its movement in said direction for operating said retaining means to release said work from positive engagement with said tool during movement of said support in the opposite direction.

11. A surface broaching machine, comprising means for retaining a broaching tool in a stationary position, a movable work support for carrying the work to be broached by said tool during movement of said support in one direction, two hydraulic motors arranged upon opposite sides of said tool and alongside the same for reciprocating said support longitudinally of said tool, means for retaining a piece of work upon said support and fixing it against movement relative thereto during broaching, said work when being broached exerting a thrust against said tool transverse to the direction of support movement and thereby tending to cause relative displacement of said tool and said support, and means carried by said support for taking said thrust to thereby prevent said relative displacement.

12. A surface broaching machine, comprising means for retaining a broaching tool in a stationary position, a movable work support for carrying the work to be broached by said tool during movement of said support in one direction, power means for reciprocating said support longitudinally of said tool, a work holder arranged upon said support for carrying the work and operable to positively fix the work against movement relative to said support during broaching, said work when being broached exerting a thrust against said tool transverse to the direction of support movement and thereby tending to cause relative displacement of said tool and said support, means carried by said support for taking said thrust to thereby prevent said relative displacement, and means responsive to said support approaching the limit of its movement in each direction for operating said work holder to move said work toward and from said tool.

13. A surface broaching machine, comprising means for retaining a surface broaching tool in a stationary position, a movable work support, power means for reciprocating said support longitudinally of said tool, a work holder arranged upon said work support for carrying a piece of work and having a wedge-bar for moving the work, and a stationary stop for engaging said wedge-bar near each limit of the work support movement to operate said work holder during continued movement of said work support.

14. A surface broaching machine, comprising means for retaining a surface broaching tool in a stationary position, a movable work support, power means for reciprocating said support longitudinally of said tool, a work holder arranged upon said work support for carrying a piece of work, a hydraulic motor for operating said work holder to move the work toward and from said tool, and means for energizing said motor near each limit of the work support movement.

15. A surface broaching machine, comprising means for retaining a broaching tool in a stationary position, a movable work support for carrying the work to be broached by said tool during movement of said support in one direction, power means for reciprocating said support longitudinally of said tool, a work holder arranged upon said support for carrying the work and operable to positively fix the work against movement relative to said support during broaching, said work when being broached exerting a thrust against said tool transverse to the direction of support movement and thereby tending to cause relative displacement of said tool and said support, means carried by said support for taking said thrust to thereby prevent said relative displacement, a hydraulic motor for operating said work holder to move the work toward and from said tool, and means for energizing said motor near each limit of the work support movement.

16. A surface broaching machine, comprising means for retaining a surface broaching tool in a stationary position, a movable work support, power means for reciprocating said support longitudinally of said tool, a work holder arranged upon said work support for carrying a piece of work, a hydraulic motor arranged in a stationary position and connected through intervening mechanism to said work holder to operate the same and thereby move the work toward and from said tool, and means for energizing said motor near each limit of the work support movement.

17. A surface broaching machine, comprising means for retaining a surface broaching tool in a stationary position, a movable work support, hydraulic power means for reciprocating said work support longitudinally of said tool, a work holder arranged upon said work support for carrying a piece of work, a hydraulic motor for operating said work holder to move the work toward and from said tool, and means for energizing said motor and said power means to cause the same to operate in a predetermined sequence.

18. A surface broaching machine, comprising means for retaining a broaching tool in a stationary position, a movable work support for carrying the work to be broached by said tool during movement of said support in one direction, hydraulic power means for reciprocating said work support longitudinally of said tool, a work holder arranged upon said support for carrying the work and operable to positively fix the work against movement relative to said support during broaching, a hydraulic motor for operating said work holder to move the work toward and from said tool, and means for energizing said motor and said power means to cause the same to operate in a predetermined sequence.

19. A surface broaching machine, comprising means for retaining a surface broaching tool in a stationary position, a movable work support, two hydraulic motors arranged upon opposite sides of said tool and alongside the same for reciprocating said work support longitudinally of said tool, a work holder arranged upon said work support for carrying a piece of work, a hydraulic motor for operating said work holder to move the work toward and from said tool, and means for causing said motors to operate said work support and said work holder in a predetermined sequence.

20. A surface broaching machine, comprising means for retaining a surface broaching tool in a stationary position, a movable work support, power means for reciprocating said support longitudinally of said tool, a work holder arranged upon said work support for carrying a piece of work, a hydraulic motor arranged upon said work support for operating said work holder to move the work toward and from said tool, and means for energizing said motor near each limit of the work support movement.

21. A surface broaching machine, comprising means for retaining a surface broaching tool in a stationary position, a movable work support, hydraulic power means for reciprocating said work support longitudinally of said tool, a work holder arranged upon said work support for carrying a piece of work, a hydraulic motor arranged upon said work support for operating said work holder to move the work toward and from said tool, and means for energizing said motor and said power means to cause the same to operate in a predetermined sequence.

22. A surface broaching machine, comprising means for retaining a surface broaching tool in a stationary position, a movable work support, hydraulic power means for reciprocating said work support longitudinally of said tool, a work holder arranged upon said work support for carrying a piece of work, a hydraulic motor arranged in a stationary position and connected through intervening mechanism to said work holder to operate the same and thereby move the work toward and from said tool, and means for energizing said motor and said power means to cause the same to operate in a predetermined sequence.

23. A surface broaching machine, comprising means for retaining a broaching tool in a stationary position, a movable work support for carrying the work to be broached by said tool during movement of said support in one direction, power means for reciprocating said support longitudinally of said tool, means for retaining a piece of work upon said support and fixing it against movement relative thereto during broaching, said work when being broached exerting a thrust against the face of said tool transverse to the direction of support movement and thereby tending to cause relative displacement of said tool and said support, and a guide fixed to said work support in contact with the back of said tool to slide thereon during support movement and providing a reaction to said thrust and, thereby preventing said relative displacement.

24. A surface broaching machine, comprising a frame having an elongated broach support, a broaching tool fastened to said broach support and supported thereby throughout its entire effective length, a movable work support for carrying the work to be broached by said tool during movement of said work support in one direction, power means for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, and abutment means carried by said work support and engaging said broach support behind said tool to take said thrust and thereby prevent said relative displacement.

25. A surface broaching machine, comprising a frame having an elongated broach support, a broaching tool fastened to said broach support and supported thereby throughout its entire effective length, a movable work support for carrying the work to be broached by said tool during movement of said work support in one direction, power means for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, abutment means carried by said work support and engaging said broach support behind said tool to take said thrust and thereby prevent said relative displacement, and means responsive to said support approaching the limit of its movement in said direction for operating said retaining means to release said work from positive engagement with said tool during movement of said support in the opposite direction.

26. A surface broaching machine, comprising a frame having an elongated broach support, a broaching tool fastened to said broach support and supported thereby throughout its entire effective length, a movable work support for carrying the work to be broached by said tool during movement of said work support in one direction, power means for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, abutment means carried by said work support and engaging said broach support behind said tool to take said thrust and thereby prevent said relative displacement, and means responsive to said support approaching the limit of its movement in said direction for retracting the work out of broaching position.

27. A surface broaching machine, comprising a frame having an elongated broach support, a broaching tool fastened to said broach support and supported thereby throughout its entire effective length, a movable work support for carrying the work to be broached by said tool during movement of said work support in one direction, hydraulic power means arranged alongside said broach support for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, abutment means carried by said work support and engaging said broach support behind said tool to take said thrust and thereby prevent said relative displacement.

28. A surface broaching machine, comprising a frame having an elongated broach support, a broaching tool fastened to said broach support and supported thereby throughout its entire effective length, a movable work support for carrying the work to be broached by said tool during movement of said work support in one direction, two reciprocating hydraulic motors arranged parallel to said broach support upon opposite sides thereof for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, and abutment means carried by said work support and engaging said broach support behind said tool to take said thrust and thereby prevent said relative displacement.

29. A surface broaching machine, comprising a frame having an elongated broach support, a broaching tool fastened to said broach support and supported thereby throughout its entire effective length, a movable work support for carrying the work to be broached by said tool during movement of said work support in one direction, power means for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, and a reaction member extending behind said tool from each side thereof into contact with said broach support to take said thrust and thereby prevent said relative displacement.

30. A surface broaching machine, comprising a frame having an elongated broach support, a broaching tool formed of a plurality of sections each of which is fastened to said broach support and supported thereby, a movable work support for carrying the work to be broached by said tool during movement of said work support in one direction, power means for reciprocating said work support longitudinally of said tool, means for retaining a piece of work upon said work support and fixing it against movement relative thereto during broaching, said work when being broached exerting a thrust against said tool transverse to the direction of support movement and thereby tending to cause relative displacement of said tool and said work support, and abutment means carried by said work support and engaging said broach support behind said tool to take said thrust and thereby prevent said relative displacement.

WALTER FERRIS.

CERTIFICATE OF CORRECTION.

Patent No. 2,065,219.                                            December 22, 1936.

Walter Ferris.

It is hereby certified that error appears in the above numbered patent requiring correction as follows: The drawings, Sheets 9, 10, and 11, containing Figures 20, 21, and 22, as shown below should be inserted as part of the Letters Patent. In the heading to the drawings, Sheets 1, 2, 3, 4, 5, 6, 7, and 8 respectively, line 3, for "8 Sheets" read 11 Sheets.

Dec. 22, 1936.  W. FERRIS  2,065,219

BROACHING MACHINE

Original Filed Feb. 9, 1934    11 Sheets-Sheet 9

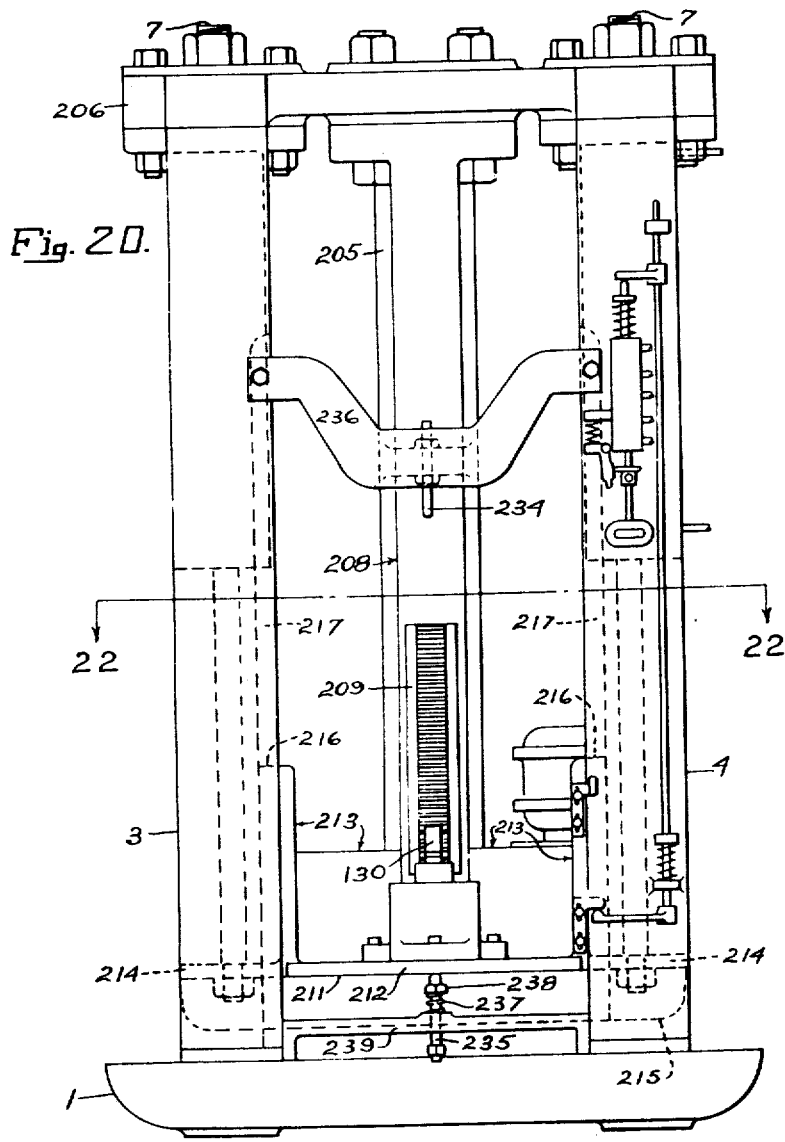

INVENTOR
WALTER FERRIS.
BY
ATTORNEY.

Dec. 22, 1936.  W. FERRIS  2,065,219
BROACHING MACHINE
Original Filed Feb. 9, 1934   11 Sheets-Sheet 10

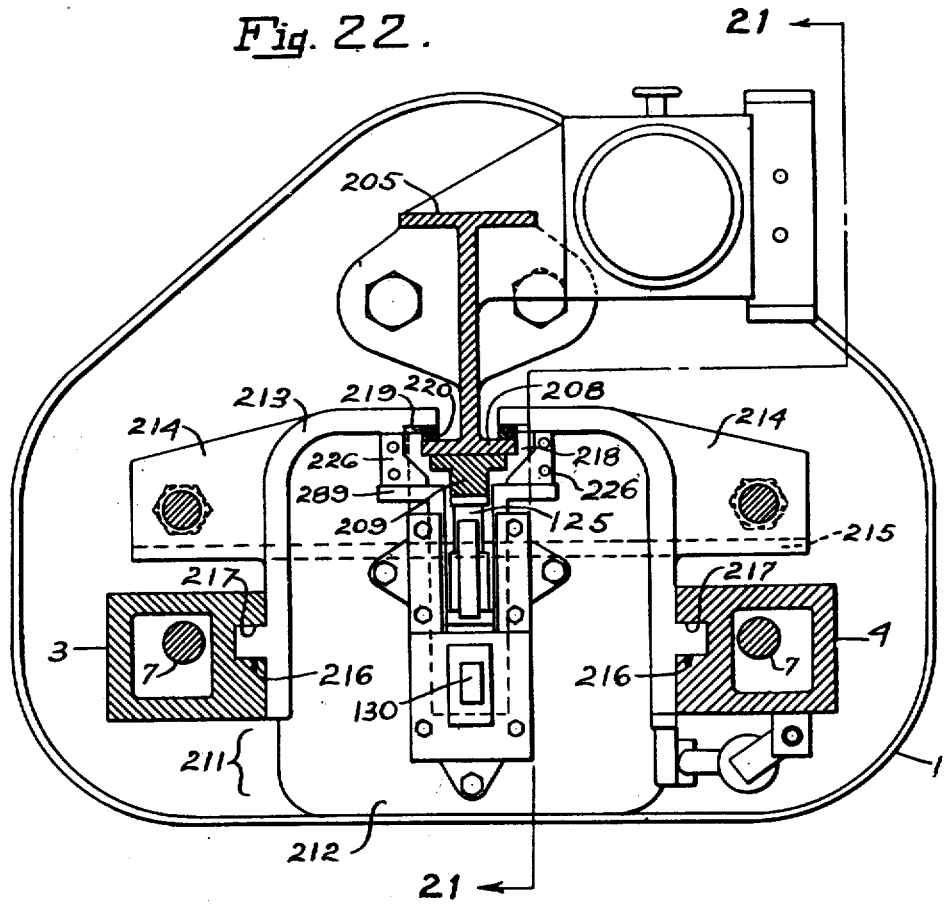

INVENTOR
WALTER FERRIS
BY
Wesley P. Merrill
ATTORNEY.